United States Patent [19]

Carter

[11] Patent Number: 5,099,598
[45] Date of Patent: Mar. 31, 1992

[54] FIRE ANT TRAPPING APPARATUS AND METHOD

[76] Inventor: Lynn Carter, 3005 Garden Villa, Austin, Tex. 78704

[21] Appl. No.: 720,184

[22] Filed: Jun. 24, 1991

[51] Int. Cl.⁵ ............................................. A01M 1/20
[52] U.S. Cl. .................... 43/132.1; 43/144; 43/121
[58] Field of Search .............. 43/124, 132.1, 110, 43/144, 121

[56] References Cited

U.S. PATENT DOCUMENTS

| | | | |
|---|---|---|---|
| 213,235 | 3/1879 | Mueller | 43/124 |
| 222,134 | 12/1979 | Herschman | . |
| 876,612 | 1/1908 | Watkins | 43/132.1 |
| 1,126,216 | 1/1915 | Holman | 43/121 |
| 1,314,242 | 8/1919 | Bjorge | 43/121 |
| 2,100,909 | 11/1937 | Mora | 43/121 |
| 4,637,161 | 1/1987 | Turner | . |
| 4,640,044 | 2/1987 | Varnon | . |
| 4,667,436 | 5/1987 | Benson | . |
| 4,756,118 | 7/1988 | Evans | . |
| 4,815,234 | 3/1989 | Connolly | . |
| 4,953,320 | 9/1990 | Nelson | . |

*Primary Examiner*—Richard K. Seidel
*Assistant Examiner*—James Miner
*Attorney, Agent, or Firm*—Shaffer & Culbertson

[57] ABSTRACT

An apparatus for trapping fire ants includes a trapping container defining an ant nesting space. The trapping container includes a bottom opening at a base end thereof that provides an ant access to the nesting space within the trapping container, and a top opening at the end of the trapping container opposite the base end. A nesting material is positioned within the trapping container above the container bottom opening and closure devices are positioned at both ends of the trapping container for sealably closing the top and bottom openings. A heating device is associate with the trapping container for heating at least a portion of the nesting space to an ant attracting temperature. The heating device also preferably may be used to heat the nesting space to an ant killing temperature after ants have been attracted thereto. In operation the trapping container is placed upon the ground adjacent to an active fire ant nest with the base end and bottom opening down and the heating device is operated to produce the ant attracting temperature within the trapping container. After the queen ants and eggs from the adjacent fire ant nest are moved into the nesting space, the trapping container may be sealed and then heated to a temperature sufficient to kill the ants therein.

13 Claims, 1 Drawing Sheet

FIRE ANT TRAPPING APPARATUS AND METHOD

BACKGROUND OF THE INVENTION

The invention relates to an apparatus and method for trapping insects, particularly imported fire ants. The invention also encompasses an apparatus and method for controlling imported fire ant populations.

Imported fire ants of the genus solenopsis have become a serious problem in the United States since their introduction early this century. To date, imported fire ants have infested generally the entire southern portion of the United States. The imported fire ant is continuing to spread its range northward and to the west.

The venomous and very aggressive imported fire ants not only pose a health risk to humans, but are also known to kill livestock and pets. Furthermore, imported fire ants tend to overwhelm and drive out indigenous species of insects and other creatures. Beyond the direct threat posed to humans, livestock, and other creatures, imported fire ants do serious crop damage and therefore cause economic injury.

Although imported fire ants have been a steadily growing problem in the United States since the early part of this century, the numerous control methods that have been developed have generally proven ineffective. For example, highly toxic contact poisons are ineffective because fire ants have the ability to move their queens quickly to avoid the applied chemical. Established fire ant mounds have several queens and if only one queen survives a poison application, she can quickly produce a new mound. Even if poisons provided effective control, their use would be undesirable due to the environmental damage that such materials inevitably cause.

As a safer alternative to poisons, insect growth regulators have been developed for use in controlling imported fire ant populations. Although insect growth regulators do provide control of fire ant populations, there are several disadvantages associated with such control methods. One disadvantage is that insect growth regulators work slowly and provide control only after at least one egg cycle. This leaves the fire ant population undisturbed for at least six weeks. Also, the insect growth regulator is dispersed through a bait left for forging ants and this bait looses its effectiveness quickly, particularly in rainy weather.

There is therefore a need for a safe, non-toxic, and fast working method for controlling fire ant populations.

SUMMARY OF THE INVENTION

It is a general object of the invention to provide an apparatus and method for trapping fire ants and thereby controlling fire ant populations.

In furtherance of this object, an apparatus embodying the principles of the invention includes a trapping container defining an ant nesting space therein. The trapping container includes a bottom opening and a top opening with a fire ant nesting material positioned in the nesting space of the container. A top closure device is adapted to sealably close the top opening when desired and a bottom closure device is adapted to sealably close the bottom opening to the trapping container. Also, the apparatus includes heating means for heating at least a portion of the nesting material to a fire ant attracting temperature.

In operation, the trapping container is placed with its bottom opening down on the ground in an area in which fire ants are active, preferably adjacent to an existing fire ant nest. With the trapping container in position and the container open at the bottom and the top, the heating means is operated to heat at least a portion of the nesting material to an ant attracting temperature. The foraging ants quickly locate the heated nesting material which represents an ideal nesting area, and move their queens and existing eggs into the trapping container. The bottom and top openings to the container may then be closed with the closure devices to trap the fire ants and, most importantly, the queens and eggs.

In one preferred form of the invention, the heating means is not only capable of heating at least a portion of the nesting material to an ant attracting temperature, but is also capable of heating the entire nesting space to an ant killing temperature. In this preferred form of the invention the heating means includes multiple heating elements. One heating element provides the ant attracting heat and may assist in providing killing heat. Another heating element is used only to heat the nesting space to the desired ant killing temperature. In this preferred form of the invention, once the ants and queens are trapped, the heating means operates to heat the entire nesting space to a temperature high enough to kill the trapped ants and eggs. Eliminating the queen ants breaks the reproductive cycle of the ants and achieves quick control of the fire ant population.

To help encourage ants to move completely into the nesting material, the preferred form of the invention includes a shading member connected to the trapping container to provide shade around the base of the trapping container. The shading ring prevents direct sunlight from heating the base of the container to a temperature that would also be an attractive nesting temperature and cause the ants to leave one or more queens outside of the nesting material or near the container bottom opening.

Also, the preferred form of the invention includes leveling or ground conforming means connected to the trapping container at its bottom end. The ground conforming means comprises a tube of flexible material loosely filled with a liquid or granular solid material and capable of conforming to irregularities in the ground surface.

These and other objects, advantages, and features of the invention will be apparent from the following description of the preferred embodiments, considered along with the accompanying drawings.

DESCRIPTION OF THE PREFERRED EMBODIMENTS

Figure 2:
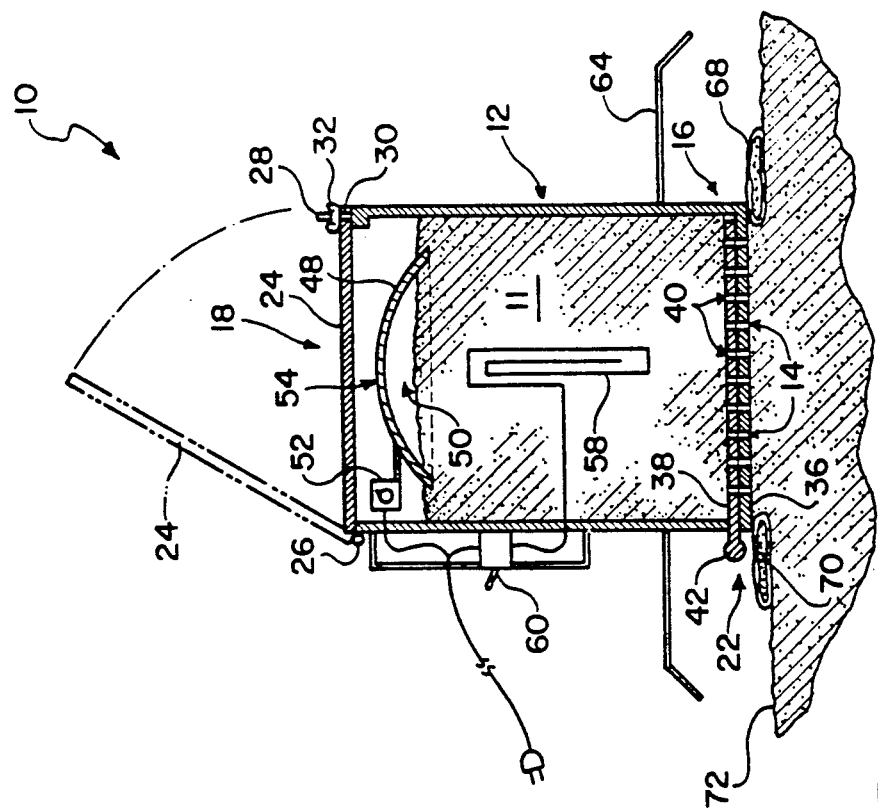
FIG. 2 is a view in section taken along line 2—2 in FIG. 1.
Figure 1:
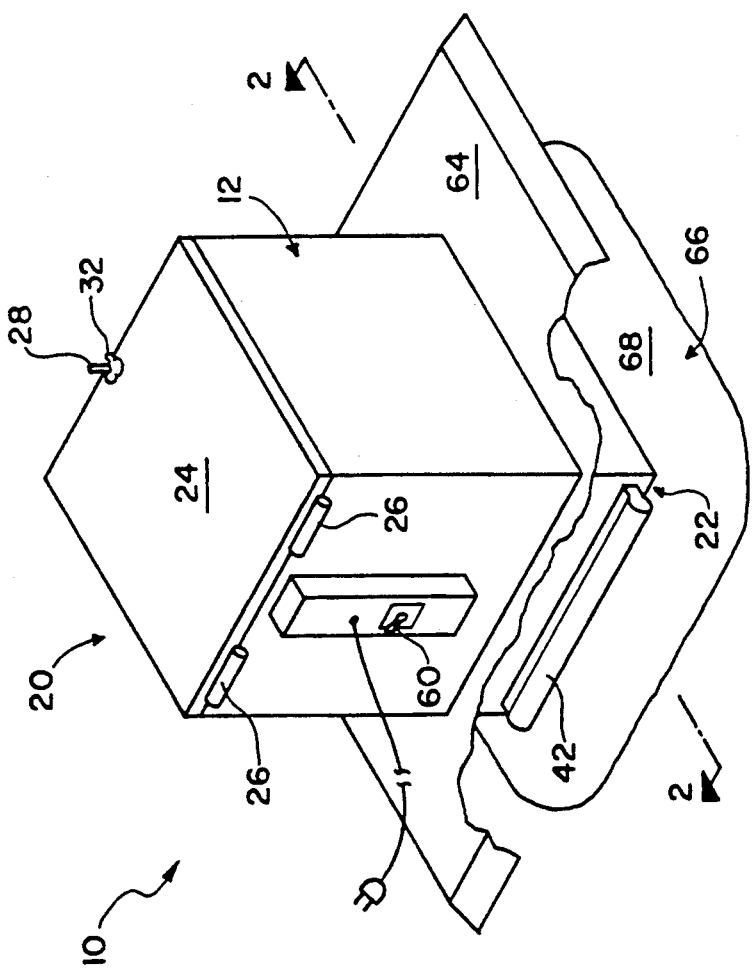
FIG. 1 is a view in perspective of fire ant trapping apparatus embodying the principles of the invention.

FIGS. 1 and 2 show a fire ant trapping apparatus 10 embodying the principles of the invention. The trapping apparatus 10 comprises a trapping container 12 filled with a nesting material 11 and having bottom openings 14 at a base end 16, and a top opening 18. The apparatus 10 also includes top closure means 20 for selectively closing the top opening 18, and bottom closure means 22 for selectively blocking or closing the container bottom openings 14.

In the illustrated form of the invention shown in the figures, the trapping container 12 is rectangular. However, the container 12 may alternatively be cylindrical or any other desired shape. The top closure means 20 comprises a lid 24 capable of pivoting on a hinge 26 between a closed position and an open position. The open position is shown in phantom in FIG. 2. In the closed position, the lid 24 fits tightly over the container top opening 18 to prevent ants from escaping the container therethrough. Also, a bolt 28 connected to the trapping container 12 is adapted to extend through an opening 30 on the lid 24 when the lid is in the closed position so that a suitable nut such as the wing nut 32 may be received on the bolt and tightened to ensure the desired seal. Although the bolt 28 and wing nut 32 form a preferred locking means for the lid 24, numerous alternative locking arrangements may be employed to provide the desired seal.

The container bottom openings 14 comprise a series of small openings formed through a bottom member 36 of the container 12. The bottom closure means 22 comprises a planar slide member 38 having a series of similar openings 40. To leave the bottom of the container 12 open and allow access to the container therethrough, the slide member 38 is positioned so that its openings 40 align with the openings 14 formed in the container bottom member 36. The container bottom openings 14 are closed or sealed by moving the slide member 38 to a position in which its openings 40 are misaligned with the container bottom openings 14 and thereby block such openings. Appropriate open and closed marks on the slide member 38 near the slide member handle 42 may be used to indicate an open or closed position.

The nesting material 11 is preferably a moist soil, rock, and organic compost mix. This mixture of soil, organic material, and rocks provides an ideal medium in which fire ants may nest. Preferably, rocks in the nesting material at the bottom of the container 12 prevent the nesting material from falling out of the container bottom openings 14 when the bottom openings are unblocked by the slide member 38. Also, as shown in FIG. 2, the preferred level of the nesting material 11 is somewhat below the top opening 18 of the container 12.

The apparatus 10 also includes heating means for heating at least a portion of the nesting material 11 to an ant attracting temperature. The preferred heating means includes a heating cover 48 having an electrical resistive heating element (not shown) associated therewith. The heating cover 48 is adapted to be placed loosely on top of the nesting material 11 in the container 12 leaving a small open egg space 50 between the top of the material 11 and the cover itself. In the preferred form of the invention, the heating element of the heating cover 48 is controlled through a thermostat 52 and is capable of maintaining the temperature in the egg space 50 and at the surface of the nesting material 11 at 19 an ant attracting temperature preferably in a range between 87° F. and 95° F. Also, the heating cover 48 may have its upper surface 54 coated with a solar energy absorbing material to assist the resistive element (not shown) in heating the egg space 50 and nesting material 11 directly under the cover.

In the illustrated preferred form of the invention, the heating means operates on standard 110 volt AC power. Alternate forms of the invention, however, may include a series of solar cells for generating the electrical power required for operating the resistive element (not shown) of the cover member 48. In yet other forms of the invention the heating means may comprise the energy absorbing material on the upper surface 54 of the heating cover 48 and thus may rely on direct heating from the sun. Where the heating means relies only on direct heating from the sun, however, there will be no control for regulating the ant attracting temperature to the desired range, and the nesting material 11 and egg space 50 below the cover 48 will be allowed to cool at nighttime.

The heating means also preferably includes a nest heating element 58 for heating the interior of the trapping container 12 to an ant killing temperature. The preferred nest heating element 58 comprises a second electrical resistive element coiled in a spiral configuration and aligned generally vertically in the center of the nesting material 11 within the container 12. The element 58 also preferably operates on 110 volt AC power controlled through an on/off switch 60 mounted on the container 12. The ant killing temperature may be any temperature sufficient for quickly killing the fire ants trapped in the container, for example 400° F.

The illustrated form of the invention also includes a shading ring 64 and leveling means 66. The shading ring 64 is connected around the periphery of the trapping container 12 near its base end 16 and extends a sufficient distance to shade the bottom of the container from direct sunlight for most of the day. The shading ring 64 thus prevents direct solar heating of the nesting material 11 at the base end 16 of the trapping container 12, thereby leaving the nesting material 11 at the top of the trapping container 12 more attractive due to its higher temperature. The lower temperature at the base end 16 of the trapping container discourages the ants from leaving the queens and eggs at the bottom of the container where they may escape before the bottom openings 14 are blocked.

The leveling means 66 comprises a tube of flexible material 68 connected around the periphery of the container base end 16. The tube 68 is loosely filled with a liquid or a granular solid 70 so as to allow the tube material to conform to the ground surface 72, while the container 12 remains upright.

In the operation of the apparatus 10, and according to the method of the invention, the nesting material-filled trapping container 12 is first located base end down on the ground 72 in an area in which fire ants are active. The best location for the container 12 is immediately adjacent to or at least near an existing fire ant nest or mound. With the bottom openings 14 of the container 12 open and the lid 24 in the open position, the preferred method also includes positioning the heating cover 48 on top of the nesting material 11 in the container to define the egg space 50.

With the trapping container 12 in position, the method also includes heating at least a portion of the nesting material 11 in the container to an ant attracting temperature. This step is preferably performed using the heating cover 48 to control the temperature in the egg space 50 and at the surface of the nesting material 11 to the ant attracting temperature, preferably in the range of 87° F. to 95° F. This elevated ant attracting temperature encourages the ants to move the queen or queens from the existing nest to the trapping container 12, and particularly, to the egg space 50. Food or bait (not shown) may also be positioned under the cover 48 to help attract the ants. The elevated, ant attracting temperature is particularly effective in attracting ants to move their queens early or late in the season when ambient temperatures are cool and therefore not ideal egg hatching conditions.

After several hours of maintaining at least a portion of the nesting space inside the trapping container 12 at the ant attracting temperature, and the ants are attracted into the nesting material 11, the method of the invention includes sealing the container with the top closure means 20 and the bottom closure means 22 thereby trapping in the container the ants, and most importantly, the queens and eggs. The presence of the queens and eggs may be easily observed prior to sealing the container, by lifting the heating cover 48.

After the trap is sealed the method of the invention preferably includes introducing killing means into the container interior to kill the ants and eggs therein. In the illustrated preferred form of the invention, the step of introducing killing means comprises heating the nesting material 11 in the interior of the trapping container 12 to a killing temperature using the nest heating element 58. Although the resistive heating element 58 is preferred, other means may be employed to kill the ants in the container such as introducing a suitable poison.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for trapping ants comprising:
   (a) a trapping container defining an ant nesting space;
   (b) a bottom opening at a base end of the trapping container providing an ant access to the nesting space within the trapping container;
   (c) a top opening at the end of the trapping container opposite the base end;
   (d) a nesting material positioned within the ant nesting space above the container bottom opening so that the container bottom opening provides an ant access to the nesting material;
   (e) top closure means for sealably closing the container top opening;
   (f) bottom closure means for sealably closing the container bottom opening; and
   (g) heating means for heating at least a portion of the nesting space to an ant attracting temperature.

2. The apparatus of claim 1 wherein the heating means is also for heating substantially the entire ant nesting space to an ant killing temperature.

3. The apparatus of claim 1 wherein:
   (a) the nesting material includes an upper surface below the container top opening; and
   (b) the heating means includes a heating cover capable of being positioned over the nesting material upper surface and leaving an egg space above the upper surface.

4. The apparatus of claim 3 wherein:
   (a) the heating cover includes a thermostatically controlled electrical heating element capable of selectively alternatively holding the temperature in the egg space at an ant attracting temperature or at an ant killing temperature; and (b) the heating means further comprises an electrical nest heating element mounted in the nesting material for heating the nesting material to a killing temperature.

5. The apparatus of claim 1 further comprising:
   (a) leveling means mounted at the base end of the trapping container for conforming to minor irregularities on the surface on which the trapping container is to be employed.

6. The apparatus of claim 5 wherein the leveling means comprises:
   (a) a tube of flexible material extending around the base end of the trapping container; and
   (b) a granular material loosely filling the tube of flexible material.

7. The apparatus of claim 1 further comprising:
   (a) shading means extending transversely around the perimeter of the trapping container for shading the area around the base end of the trapping container from direct sunlight when the trapping container is placed in a trapping position on a surface with the base end of the container down, thereby cooling the area around the base end of the container to encourage ants to position their eggs in the nesting space maintained at the ant attracting temperature.

8. A method for trapping fire ants comprising the steps of:
   (a) positioning a trapping container with a base end of the container down on a ground surface near an existing fire ant nest, the base end of the trapping container including a bottom opening for enabling fire ants to enter the trapping container;
   (b) heating at least a portion of a nesting area within the trapping container to a fire ant attracting temperature, the trapping container containing within the nesting area a fire ant nesting material positioned above the container bottom opening; and
   (c) sealing all openings to the trapping container after fire ants from the adjacent fire ant nest have relocated fire ant queens and eggs from the adjacent nest to the nesting area within the container.

9. The method of claim 8 further comprising the step of:
   (a) introducing into the trapping container means for killing the fire ants trapped therein.

10. The method of claim 9 wherein the step of introducing means for killing fire ants includes heating the contents of the trapping container to a fire ant killing temperature.

11. The method of claim 8 further comprising the steps of:
    (a) covering a top surface of the nesting material in the container with a cover member to form an egg space above the top surface of the nesting material; and
    (b) heating the top surface of the nesting material and the egg space to an ant attracting temperature.

12. The method of claim 11 further including the step of:
    (a) placing a bait material in the egg space.

13. The method of claim 8 further comprising the step of:
    (a) shading the area of ground around the base end of the trapping container from direct sunlight.

* * * * *

UNITED STATES PATENT AND TRADEMARK OFFICE
CERTIFICATE OF CORRECTION

PATENT NO. : 5,099,598

DATED : March 31, 1992

INVENTOR(S) : Lynn Carter

It is certified that error appears in the above-identified patent and that said Letters Patent is hereby corrected as shown below:

In Claim 12, column 6, line 58 of the Patent, change "11" to --10--.

Signed and Sealed this

Eighth Day of June, 1993

Attest:

MICHAEL K. KIRK

Attesting Officer

Acting Commissioner of Patents and Trademarks